Figures 1, 2:
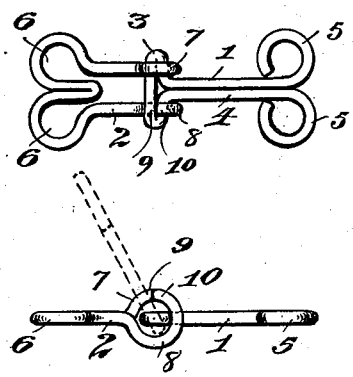

No. 727,831. PATENTED MAY 12, 1903.
N. R. & J. M. PERSINGER.
HOOK AND EYE.
APPLICATION FILED JULY 24, 1902.

NO MODEL.

Witnesses,

Inventors
Newton R. Persinger,
John M. Persinger,
By Offield Towle Linthicum
Attys.

No. 727,831. Patented May 12, 1903.

UNITED STATES PATENT OFFICE.

NEWTON R. PERSINGER AND JOHN M. PERSINGER, OF CENTRAL CITY, NEBRASKA.

HOOK AND EYE.

SPECIFICATION forming part of Letters Patent No. 727,831, dated May 12, 1903.

Application filed July 24, 1902. Serial No. 116,853. (No model.)

*To all whom it may concern:*

Be it known that we, NEWTON R. PERSINGER and JOHN M. PERSINGER, citizens of the United States, residing at Central City, in the county of Merrick and State of Nebraska, have invented certain new and useful Improvements in Hooks and Eyes, of which the following is a specification.

This invention relates to improvements in hooks and eyes; and the objects of the invention are to provide a construction which is more convenient of manipulation in hooking and unhooking and which is less liable to become accidentally unhooked than the devices of this character now in general use, to provide a construction which is practically devoid of any projections upon which garments or parts of wearing-apparel may become accidentally hooked, to provide a construction which is amply strong to withstand any ordinary stress and which is of such form or configuration as to occupy a more nearly flat plane than the constructions now in common use, and in general to provide a simple, cheap, and reliable construction of the character referred to.

To the above ends the invention consists in the matters hereinafter described, and more particularly pointed out in the appended claims, and the invention will be more readily understood by reference to the accompanying drawings, forming a part of the description, and in which—

Figure 1 is a plan view of the hook and eye interengaged, and Fig. 2 is a side elevation of these parts looking toward that side of the device upon which the open eye member is located.

In the drawings, 1 designates as a whole the hook member, and 2 the eye member, these parts being, as usual, most economically and satisfactorily formed of wire. The hook member consists of a substantially T-shaped head and shank 3 and 4, respectively, the shank or stem terminating in a pair of laterally-disposed eyes 5. Preferably the hook member is made of a continuous length of wire bent upon itself to form the head member 3, which is symmetrically disposed with reference to the shank 4, the latter being formed by a continuation of the two ends of the wire which forms the head extending parallel with each other and curved outwardly at their ends and formed into the eyes 5.

The eye member is likewise formed of a single continuous length of wire, which is bent into an approximately W shape to form the securing eyes or loops 6 6, and the ends of the wire or continuations of the outer arms of the W figure formed into eyes 7 and 8, which stand in a plane at right angles to the plane of the securing-eyes 6, are laterally opposite and parallel with each other and stand at a distance apart approximately equal to the width or transverse thickness of the duplex shank 4. One of the eyes 7 of the hook member is closed or substantially closed, as indicated clearly in Fig. 2; but the opposite eye, as 8, is open at its upper side, as indicated at 9, said opening 9 being of ample width to permit the passage of the shank 4 therethrough freely. The end 10 of the open eye is preferably located approximately vertically above the center of the eye—*i. e.*, in a line perpendicular to the plane of the hook and eye as a whole—the eye when thus constructed being sufficiently complete to afford a perfect holding engagement with the T-head of the hook member, but nevertheless being sufficiently open to prevent lace or light fabrics from becoming hooked fast within the eye. The opposite eye member 7, by reason of its being closed against the arm of which it forms a part, obviously prevents the T-head from being disengaged from the eye member by lifting upwardly, and inasmuch as the shank of the hook member when the parts are interengaged extends between the two eyes of the eye member, as seen clearly in Fig. 1, disengagement is absolutely prevented by lateral movement of the parts relatively to each other as long as they remain in alinement with each other, or approximately so.

When it is desired to disengage the hook member from the eye member, this is very conveniently accomplished by simply swinging the hook member upwardly on the pivot-axis formed by its head resting within the eyes of the eye member until the shank is brought into lateral alinement with the opening 9, whereupon the hook member is moved laterally to carry the shank out through the opening of the eye 8, and thus disengaged from the eye member. It will be obvious that it is practically impossible for the hook member to be oscillated into the position necessary to effect the disengagement of the parts accidentally when said parts are secured to a garment in the usual manner, and consequently the members are less liable to become disengaged accidentally than are other devices of this character now in general use, although perfectly free to separate when brought into proper relation with each other. The objections pertaining to hooks and eyes of the "hump" type, which require the springing of the metal out of its normal shape before the hook and eye can be disengaged, are therefore entirely obviated in our device.

It will be seen that the construction is one which may be practically manufactured at a very low cost and that the construction not only possesses all of the usual advantages of devices of this character, but at the same time is free from most, if not all, of the objections heretofore found to prior constructions. In this connection it is to be noted that the invention is not necessarily limited to the application shown herein; but, on the contrary, the form of fastening provided by the T-shaped head and duplex eye-loops, one of which is partially open, may be embodied in other fastening devices without departing from the invention considered in its broad scope. We do not, therefore, limit our invention to the details of construction shown except to the extent that such details are made the subject of specific claims.

We claim as our invention—

1. As a new article of manufacture, a fastening device comprising a hook member having a T-shaped head, an eye member having duplex eyes adapted to receive the respective ends of the T-shaped head and to accommodate the shank portion of the hook member therebetween, one of said eyes being partially open, and means for effecting the attachment of said members to the respective parts to be fastened.

2. As a new article of manufacture, a fastening device comprising a hook member having a T-shaped head, an eye member having duplex eyes adapted to receive the respective ends of the T-shaped head, one of said eyes being partially open, and securing-loops formed integrally with said eye member, said securing-loops being arranged in a plane at right angles to the planes of the duplex eyes.

3. As a new article of manufacture, a hook member composed of a continuous length of wire bent upon itself to form a T-head and shank of duplex construction and having the terminal ends of the wire formed into securing-loops, and an eye member also formed of a continuous length of wire formed into approximately W shape to provide securing-loops and having the terminal end portions formed into a pair of laterally-opposite eyes arranged in planes substantially at right angles to the plane of the securing-loops and spaced apart, one of said eyes being partially open.

NEWTON R. PERSINGER.
JOHN M. PERSINGER.

Witnesses:
J. B. TEMPLIN,
WARD MORSE.